(12) United States Patent
Diehl et al.

(10) Patent No.: US 6,917,025 B1
(45) Date of Patent: Jul. 12, 2005

(54) COMBINED EARTH/STAR SENSOR SYSTEM AND METHOD FOR DETERMINING THE ORBIT AND POSITION OF SPACECRAFT

(75) Inventors: Hermann Diehl, München (DE); Willi Platz, München (DE); Helmut Zinner, Haar (DE); Evelyne Gottzein, Höhenkirchen (DE)

(73) Assignee: Astrium GmbH, Munich (DE)

( * ) Notice: Subject to any disclaimer, the term of this patent is extended or adjusted under 35 U.S.C. 154(b) by 0 days.

(21) Appl. No.: 09/807,158

(22) PCT Filed: Oct. 5, 1999

(86) PCT No.: PCT/DE99/03204

§ 371 (c)(1),
(2), (4) Date: May 15, 2001

(87) PCT Pub. No.: WO00/22381

PCT Pub. Date: Apr. 20, 2000

(30) Foreign Application Priority Data

Oct. 9, 1999 (DE) .......................................... 198 46 690

(51) Int. Cl.[7] .............................................. G01C 21/02
(52) U.S. Cl. ........................ 250/203.3; 701/13; 244/164
(58) Field of Search .......................... 250/203.3, 208.1; 244/164, 171; 711/13, 226, 222

(56) References Cited

U.S. PATENT DOCUMENTS

| 5,189,295 A | 2/1993 | Falbel ..................... 250/206.2 |
| 5,319,969 A | * 6/1994 | Billing-Ross et al. ..... 250/206.1 |
| 6,252,627 B1 | * 6/2001 | Frame et al. ............... 348/311 |

FOREIGN PATENT DOCUMENTS

| EP | 0589387 | 3/1994 |
| JP | 5-052549 A | * 3/1993 |

* cited by examiner

Primary Examiner—Thanh X. Luu
(74) Attorney, Agent, or Firm—Ladas & Parry LLP

(57) ABSTRACT

A combined earth-star sensor system (1) for three-axis attitude determination of satellites in space comprises separate apertures with different directions of observation and common image pickup devices (4) for the earth sensor and the star sensor. A common optical arrangement (2) for earth observation and start observation, and a deflection mirror (3) for derivation of the laterally entering light from the earth, to the common optical arrangement (2) may be provided. In one focal plane there is a focal plane sensor with an array of image pickup devices (4) with the integration time being controllable. An evaluation unit determines the orbit and the attitude of the space vehicle from the attitude and movement of the stars and of the rim of the earth in the focal plane.

19 Claims, 4 Drawing Sheets

COMBINED EARTH/STAR SENSOR SYSTEM AND METHOD FOR DETERMINING THE ORBIT AND POSITION OF SPACECRAFT

BACKGROUND OF THE INVENTION

The invention relates to a combined earth-star sensor system for three-axis attitude determination of satellites in space, as well as a method for determining the orbit and attitude of space vehicles.

For earth-oriented satellites, infrared sensors are presently used to determine roll and pitch angles, while solar sensors are used to determine the yaw angle of the satellite. This solution is associated with the disadvantage of the arrangement of several solar sensor heads used being very expensive, and of the lack of any yaw reference in the case of co-linearity of the earth and the sun. Furthermore, evaluation additionally requires an exact knowledge of the attitude of the satellite on its orbit. Moreover, errors between the measuring axes of solar sensors and earth sensors, e.g. caused by inaccuracies during installation or as a result of thermal influence, can significantly degrade the quality of measurements.

Known star sensors provide a three-axis attitude reference in an inertial system. Here too, earth alignment requires an exact knowledge of the satellite attitude. At present, CCDe are used for such star sensors. Due to the their lack of radiation resistance, they are not suitable for use in orbits with substantial radiation load, e.g. for use in geosynchronous missions.

From EP 0 589 387 A1 a combined earth-star sensor system is known which uses a single optical arrangement to carry out both star observation and earth observation in the UV range. To carry out common observation, the optical arrangement comprises a wide-angle system incorporating a mirror system. Due to the coinciding directions of observation for earth observation and star observation, the known system is only able to observe starts in proximity to the earth; and due to the sensor being designed with the strong earth radiation in mind, for attitude determination the known system is only able to observe stars of high intensity.

FIG. U.S. Pat. No. 5,189,295 a combined earth-star sensor system for three-axis attitude determination in space is known, with the combined earth-star sensor system comprising separate apertures with different directions of observation and common image pickup device for the earth sensor and the star sensor. The earth is partially shielded by a screen, so as to allow acquisition of the pole star. There is however a problem that the difference in brightness between the earth and stars has not been taken into account adequately. Consequently, adequate acquisition of the earth and stars is not ensured.

SUMMARY OF THE INVENTION

It is thus the object of the invention to provide a combined earth-star sensor system which is not limited in regard to the selection of stars suitable for observation, and which can be produced economically and which allows optimal acquisition of the stars to be observed and the earth. Furthermore, it is the object of the invention to provide a method for determining the orbit and attitude of a space vehicle, said method being more accurate and allowing optimal acquisition of the stars to be observed and the earth, as well as allowing independent on-board operation.

The combined earth-star sensor system according to the invention, for three-axis attitude determination of satellites in space comprises separate apertures with different directions of observation and common image pickup devices for the earth sensor and the star sensor. The sensor allows variable control of the exposure time so that integration can be adapted to the difference in brightness of the stars and the earth. Preferably, exposure is always in turn, one frame long and one frame short.

Observation according to the invention, of the earth and the stars with different apertures makes it possible to observe stars of magnitude 5 too. The considerable difference in the intensity of radiation of these stars when compared to earth radiation, can be absorbed by different aperture design and filtering. In spite of concurrent observation of the earth, the detection of the stars is not influenced by the scattered light from the earth, if two apertures are used. The simple design of the system according to the invention can cope with high light intensities while keeping costs low. High light intensity allows the use of economical CMOS image pickup devices.

Preferably the CMOS image pickup devices form a CMOS focal plane array as a focal plane sensor with a dynamic range of up to $1:10^6$. It makes possible variable control of the exposure time, so that integration can be adapted to the difference in brightness of the stars and the earth.

By using an alternative proposal of two different optical arrangements instead of a common optical arrangement, the wavelength bands used for detection can be optimised independently of each other.

The integrated sensor system according to the invention makes it possible to determine three attitude angles, three angle speeds, and the attitude of the space vehicle. Software control makes it possible to cover different orbits such as geosynchronous orbits, transfer orbits as well as low, middle and elliptical orbits.

The method according to the invention comprises the following steps:

simultaneous imaging of stars and rim of the earth in one focal plane of a sensor system; determining the star attitude in the focal plane; determining the rim of the earth by image processing; determining rates of rotation of the sensor system from the movement of the star image in the focal plane; and calculating the orbit and/or attitude of a space vehicle which carries the sensor system. By alternate adaptation of the exposure time or the integration time of the sensor or of the image pickup device, to the brightness of the stars and the brightness of the earth, even stars which are less bright can be acquired concurrently with the rim of the earth.

With the device and the method, highly accurate information on the orbit and the attitude of the space vehicle or satellite can be obtained concurrently.

By filtering out or acquiring a long-wave fraction of the radiation, e.g. by means of edge filters, the rim of the earth can be acquired particularly well and with particularly good stability. Additional degrees of freedom can be determined by model based tracking of the rim of the earth.

Further advantages of the invention include a low mass or possible redundancy because there is no need for further equipment such as for example gyros which were hitherto required for determining the orbit and the attitude. This results in simplified integration and inherent radiation resistance. Orbit determination is possible without the use of GPS, in particular also for near-earth and geostationary satellites. In this way, independent on-board operation can be achieved.

BRIEF DESCRIPTION OF THE FIGURES OF THE DRAWING

Below, embodiments of the invention are explained in more detail by means of the drawing.

DETAILED DESCRIPTION

Figure 1:
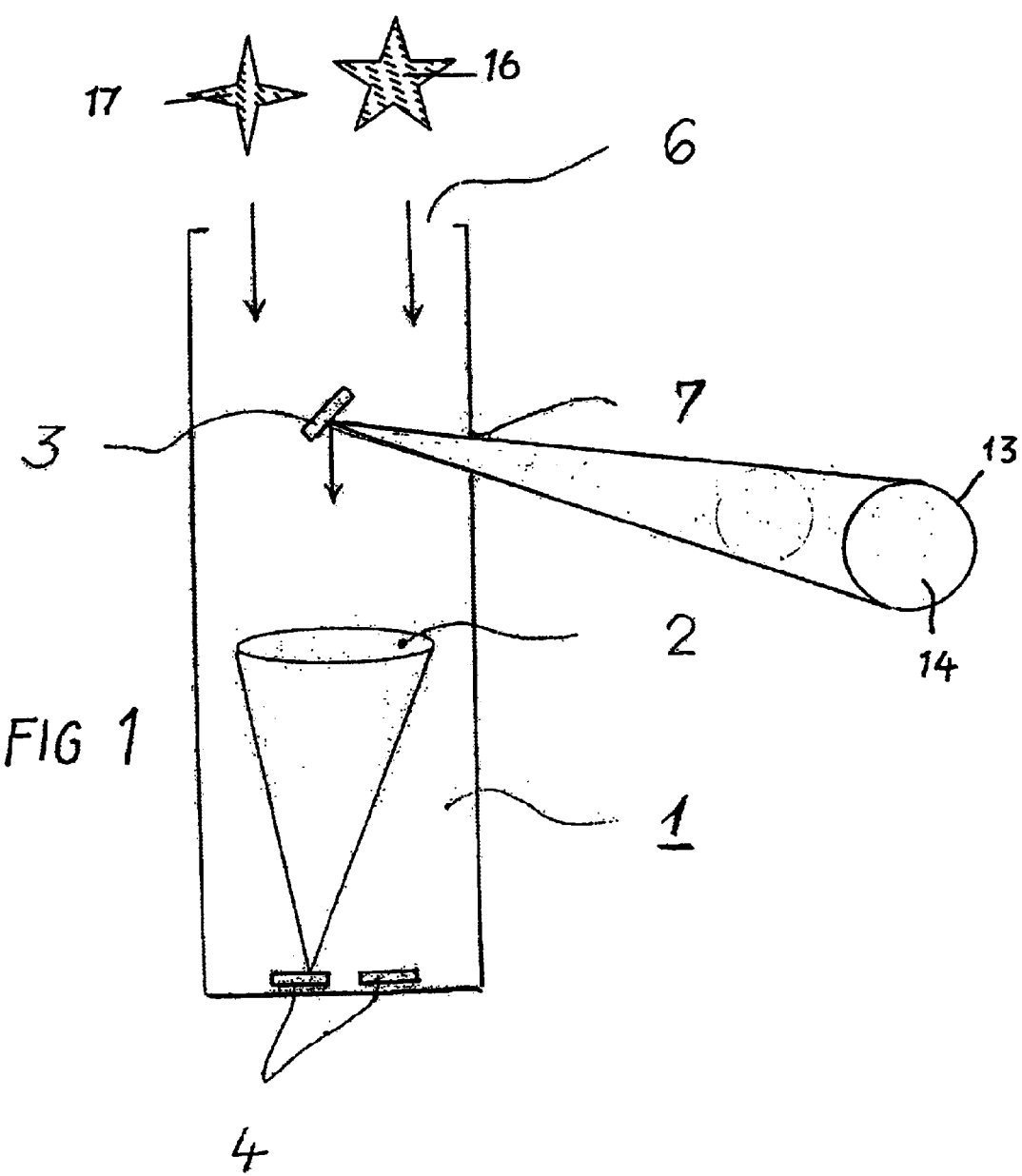
FIG. 1 shows a combined earth-star sensor system with a common optical arrangement.
Figure 1A:
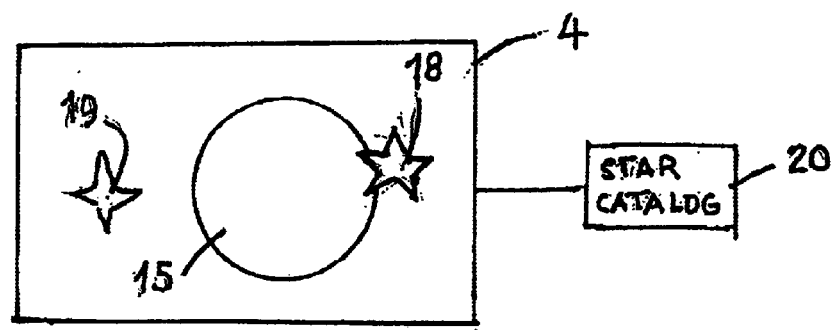
FIG. 1A shows an image pickup device in which star and earth images are superimposed.

The combined earth-star sensor system 1 shown in FIG. 1 comprises a common optical arrangement 2, a deflection mirror 3, image pickup devices 4 and windows 6 and 7 for earth and star observation.

The system shown is in particular characterised in that the observation direction to the earth differs from the observation direction to the stars.

Figure 3:
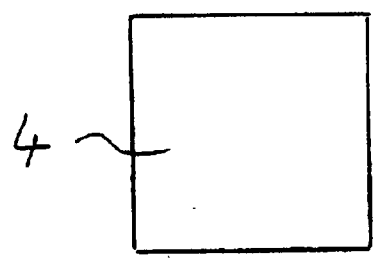
FIG. 3 shows an arrangement of image pickup devices.
Figure 3:
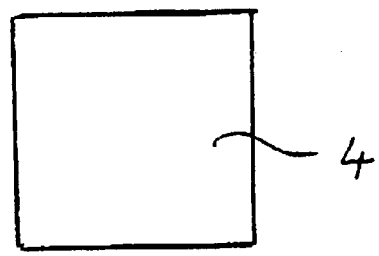
Figure 3:
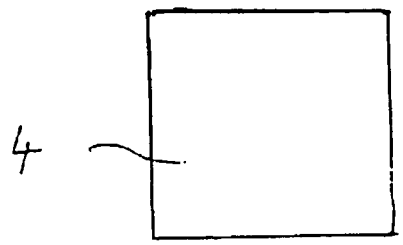
Figure 3:
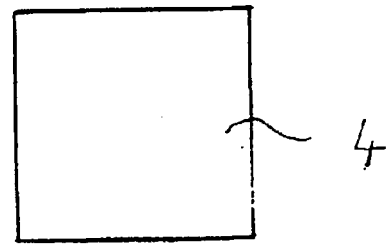

Starlight enters the window 6, passes the little deflection mirror 3, reaches the common optical arrangement 2 and is focussed onto the image pickup device 4. The light from the earth enters through the window 7, impinges on the deflection mirror 3 which directs it to the common optical arrangement 2. The common optical arrangement 2 focuses the light from the earth on the image pickup devices 4. In relation to a common optical arrangement 2, the image pickup devices 4 are arranged on a common focal plane according to a specified pattern. FIG. 3 provides an example of a possible arrangement of four image pickup devices which provide coverage over a large field of vision at a minimum number of pixels. For example, known CCD components can be used as image pickup devices, but other components such as e.g. CMOS image pickup devices can also be used.

The aperture 7 for earth observation is a small aperture which during observation of fainter stars preferably avoids interfering scattered light from the earth, and attenuates intensive sunlight which occurs at times when the sun appears in the beam path to the earth. The image 15 of the earth through window 7 and the images 18, 19 of the stars 16, 17 through window 6 are superimposed on the image pickup devices 4.

The evaluation system of the combined earth-star sensor system 1 achieves the separation of earth image 15 from star image 18 e.g. in the following way: the rim 13 of the earth is roughly determined in the image 15 i.e. determination is not to subpixel accuracy, then the image of the stars 19 which are clearly outside the earth's disk are evaluated; to this effect the stars are compared with the star catalog 20; in the star catalog, those stars 16 are determined whose image 18 is too close to the rim of the earth, e.g. up to 3 pixels, and which would thus disturb an exact location determination; the rim of the earth is then located to subpixel accuracy, with those pixels not being counted which are too close to disturbing stars 16.

It the difference in apertures is sufficient, then the stars which can be observed through the earth aperture do not interfere: their light is attenuated too much by the smaller aperture. Sun and moon however have to be taken into account, but on account of their large surface area they can easily be differentiated from stars.

Figure 2:
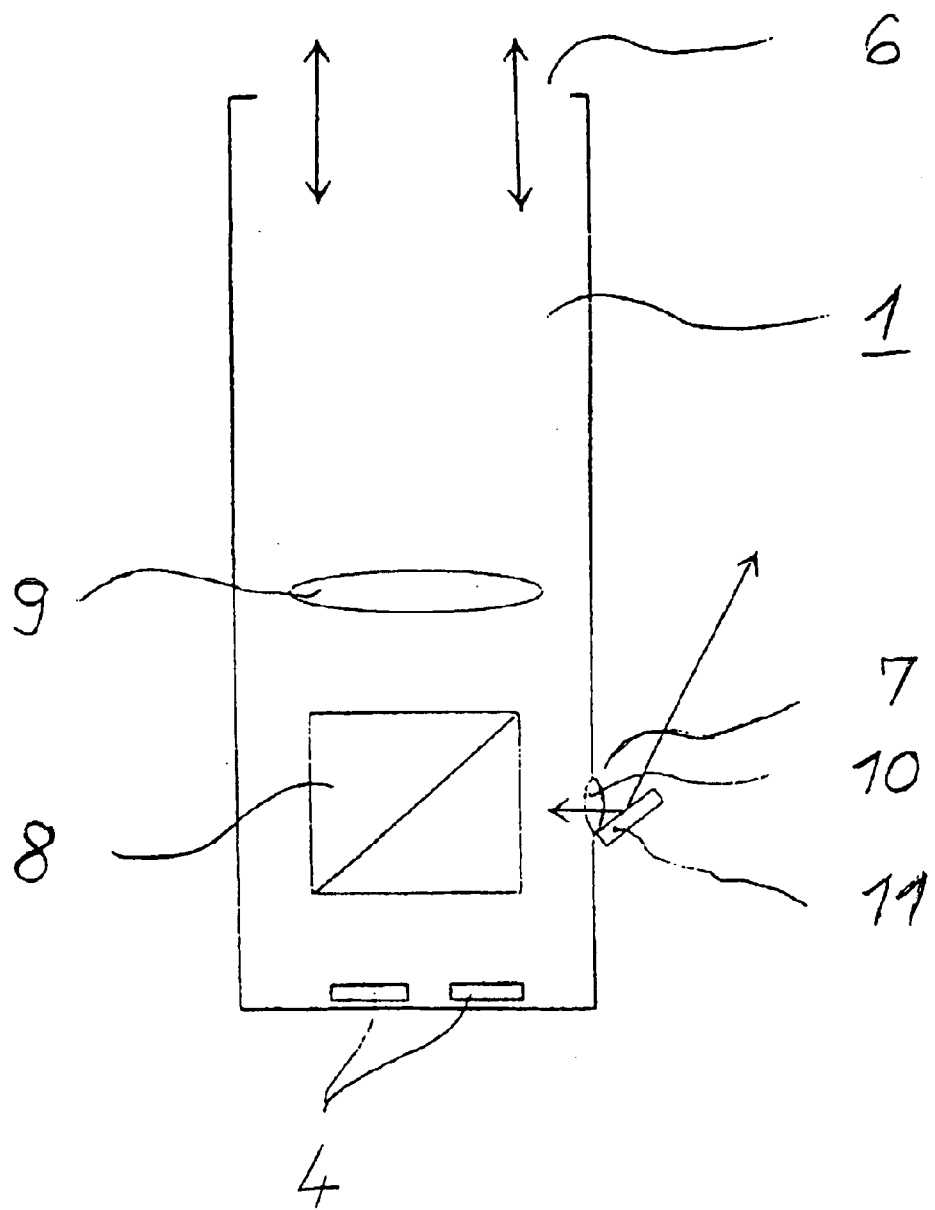
FIG. 2 shows a combined earth-star sensor system with two optical arrangements.

As an alternative to the system with a common optical arrangement, FIG. 2 shows a system with separate optical arrangements for observing the earth and the stars. In this case the combined earth-star sensor system 1 comprises a semitranslucent beam splitter 8, an optical arrangement 9 for star observation, an optical arrangement 10 if necessary with a deflection mirror 11 for earth observation arranged upstream of said optical arrangement, as well as windows 6 and 7 and image pickup devices 4.

The optical arrangement 10 for earth observation is directly inserted in window 7. Via the semitranslucent beam splitter 8, said optical arrangement forms an image on the image pickup devices 4, of the earth radiation received, if necessary via an outer deflection mirror 11. Via the beam splitter 8, the optical arrangement 9 forms an image on the image pickup devices 4, of the starlight received through window 6. FIG. 2 shows the image pickup devices 4 in a common focal plane to the beam splitter 8. The optical characteristics of the two sensors can be such that they compensate for differences in intensity; they can also be of different focal length and comprise additional attenuation filters in the beam path.

As is the case in the system described in the context of FIG. 1, the aperture for each observation is attenuated and smaller than the aperture for star observation, and the observation direction to the earth differs from the observation direction to the stars.

It is also possible to compensate for the difference in brightness of stars compared to that of the earth, by suitable control of the exposure time or the integration time of the image pickup devices 4. To this effect, during operation, exposure is always in turn, one frame long and one frame short. In the respective frame that has a relatively long exposure time, e.g. 0.1 sec., the stars are optimally acquired while in the subsequent frame with relatively short exposure time, e.g. 0.0001 sec., the rim of the earth is acquired particularly accurately.

First the star attitude is determined in the image plane. Then, by tracking the acquired stars, the movements $$\left(\frac{dx}{dt}, \frac{dy}{dt}\right)$$

of the stars in the image plane are obtained. Subsequently, the rates of rotation ($\omega_x, \omega_y, \omega_z$) are determined by solving the following equations:

$$\frac{dx}{dt} = \frac{xy}{f}\omega_x + \left(-f - \frac{x^2}{f}\right)\omega_y + y\omega_z \qquad (1)$$

$$\frac{dy}{dt} = \left(f + \frac{y^2}{f}\right)\omega_x - \frac{xy}{f}\omega_y - x\omega_x$$

with f denoting the focal length of the optical arrangement. The degrees of freedom of rotation of the space vehicle can be determined by tracking at least 2 stars ($x_i, y_i$) in the image plane.

Figure 4:
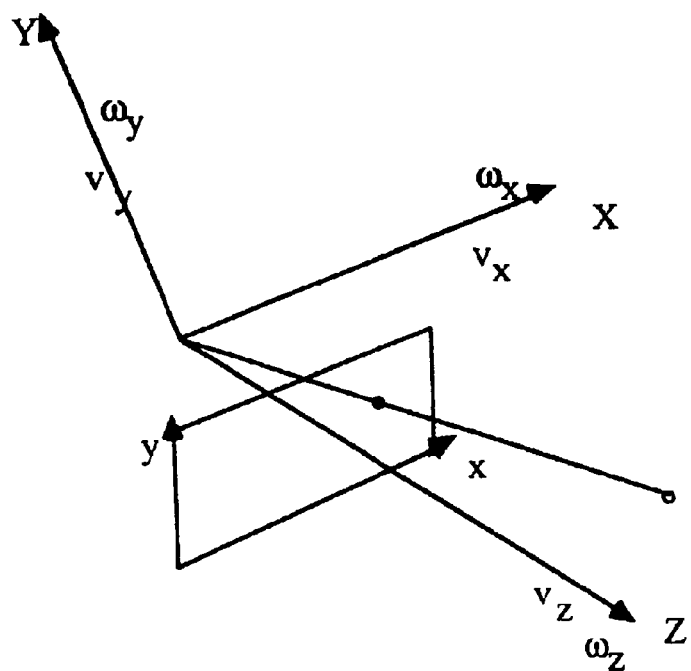
FIG. 4 shows a coordinate system whose Z-axis is directed towards the center of the earth and whose X-axis points in the direction of orbit movement.

To explain the equations, FIG. 4 shows the image plane x, y and a system of coordinates, with the satellite travelling in the x direction and with the Z-axis pointing to the centre of the earth. The rates of rotation $\omega_x, \omega_y, \omega_z$ reflect the roll, the pitch and yaw of the satellite or space vehicle.

In the next step the rim of the earth is determined to subpixel accuracy, after respective segmentation. For this purpose, an orbit-dependent model of the earth and of the earth's atmosphere is fitted to the intensity distribution in the image plane. It must be taken into account that the image has already been defocused (via 2–3 pixels) for star attitude determination at subpixel accuracy. For determination to the subpixel accuracy there is an interpolation between the individual pixel values. Segmentation, i.e. separation of the image according to earth and star, results in improved accuracy.

If the earth is imaged in its a entirety or as a sufficiently curved segment of a circle, the vector to the centre of the earth can be estimated.

Now the following formula is used to determine the orbital movement $(v_x, v_y, v_z)^T$ of the satellite from the image movement of the rim of the earth $$\left(\frac{dx}{dt}, \frac{dy}{dt}\right);$$

$$\frac{dx}{dt} = f/Z * (-v + xv_x) + C_x \quad (2)$$

$$\frac{dy}{dt} = f/Z * (v_y + yv_x) + C_y$$

Z denotes the distance to the earth's horizon which in this case is constant, $C_x$, $C_y$ are constants which depend on the known rates of rotation as follows:

$$C_x = \frac{xy}{f}\omega_x + \left(-f - \frac{x^2}{f}\right)\omega_y + y\omega_z \quad (3)$$

$$C_y = \left(f + \frac{y^2}{f}\right)\omega_y - \frac{xy}{f}\omega_y - x\omega_z$$

Again, two points $(x, y)^T$ of the rim of the earth are sufficient to estimate the orbit components. If Z is unknown, the speeds can only be determined up to a constant factor. If the rim of the earth is only imaged as a linear or quasi-linear element, then (2) only contains a measurement for the unknown quantities $v_x$, $v_y$, $v_z$.

Thus simultaneous orbit determination and attitude determination can thus for example take place via the following steps:

a) Determining the star attitude in the focal plane by means of a method with subpixel accuracy, such as e.g. centroiding;

b) Determining the rates of rotation by tracking the centroid of a surface of the stars and inverting the image equations;

c) Determining the rim of the earth by model-supported image-processing methods with subpixel accuracy;

d) Estimating the centre of the earth from the image of the rim of the earth, as far as possible; and e) Model-based tracking of the rim of the earth so as to obtain additional degrees of freedom.

What is claimed is:

1. A combined earth-star sensor system for three-axis attitude determination and orbit tracking of a satellite in space, said combined earth-star sensor system (1) comprising separate apertures (7,6) with different directions of observation of earth (14) and its rim (13) and stars to receive light from the earth (14) and stars (16, 17), having respective levels of brightness and common image pickup devices (4) for the earth observation and the star observation, and an evaluation system for determining attitude and orbit of the satellite based on earth observation of the rim (13) of the earth (14) and star observations and wherein star observation is compared to a star catalog (20) and for star images (18) which are superimposed on an image of the rim of the earth (15), said image of the rim of the earth on which the star images are superimposed are disregarded to eliminate interference of the star images on accuracy of determining the rim (14) of the earth.

2. The sensor system according to claim 1, comprising a common optical arrangement (2) for earth observation and star observation, and a deflection mirror (3) for reflection of laterally entering light from the earth, to the common optical arrangement (2).

3. The sensor system according to claim 1, comprising an optical arrangement (9) for star observation, an optical arrangement (10) for earth observation and a semitransparent beam splitter (8) between said apertures and the optical arrangements for deviating laterally entering light from the earth and transmitting light from the observed star, to the image pickup devices (4).

4. The sensor system according to claim 3, wherein light from the star travels longitudinally to the optical arrangement for star observation.

5. The sensor system according to claim 1, wherein the aperture for the light from the earth is considerably smaller than the aperture for the light from the star.

6. The sensor system according to claim 2, wherein the aperture for the light from the earth is considerably smaller than the aperture for the light from the star.

7. The sensor system according to claim 3, wherein the aperture for the light from the earth is considerably smaller than the aperture for the light from the star.

8. The sensor system according to claim 1, wherein said means for variable control of exposure time operates to produce successive image frames of respective long and short duration, the light from the stars being produced on long duration image frames and the light from the earth being produced on the short duration frames.

9. The sensor system according to claim 1, including means for variable control of exposure time of earth and star observations by said common image pickup devices depending on the brightness of the earth and the stars being observed.

10. The sensor system according to claim 1, wherein said images of the stars and the earth on said common image pickup devices are produced in a common focal plane in which the images are in a pixel field, said evaluation system images in the common focal plane in which images of the stars are superimposed on the image of the rim of the earth by being located within a given number of pixels from the image of the rim of the earth.

11. The sensor system according to claim 10, wherein said given number of pixels of star images from the image of the rim of the earth is three.

12. The method according to claim 9, wherein the images of the stars and the rim of the earth in said common focal plane are arranged in a field defined by pixels and those images where the star images identified by the star catalog which are located within a given number of pixels from the image of the rim of the earth are disregarded so that an accurate image of the rim of the earth is obtained without interference by those star images.

13. The method according to claim 12, wherein the star images which are disregarded are located within three pixels of the image of the rim of the earth.

14. The method according to claim 12, wherein the image of the rim of the earth is first evaluated on a coarse basis above sub-pixel accuracy and those images in which the star images are within the given number of pixels from the image of the rim of the earth are disregarded whereafter the image of the rim of the earth is accurately obtained to sub-pixel accuracy.

15. A method for simultaneous orbit determination and attitude determination of a space vehicle, comprising:
   simultaneously forming images of stars and the rim of the earth in a common focal plane of a sensor system;
   determining attitude of a star in said focal plane;
   determining the rim of the earth by image processing;
   determining rates of rotation of the sensor system from movement of said star image in the focal plane; and
   calculating at least one of orbit and altitude of the space vehicle carrying the sensor system, wherein an evaluation system of the sensor system carries out star tracking and tracking of the rim of the earth, and wherein said star images in said common focal plane are identified from a star catalog and only star images outside the rim of the earth are utilized in star tracking whereas areas in the images in the common focal plane in which the star images are superimposed disregarded to eliminate disruptive interference of such superimposed star images on accuracy of determining the rim of the earth.

16. The method according to claim 15, comprising effecting model-based tracking of the rim of the earth.

17. The method according to claim 15, comprising filtering a long-wave fraction of the radiation used for determining the rim of the earth.

18. The method according to claim 15, wherein the rim of the earth is determined by fitting earth models.

19. The method according to claim 15, in which exposure or integration time of the sensor system is alternatingly adapted to a difference in brightness of the light from the star and the earth.

* * * * *

UNITED STATES PATENT AND TRADEMARK OFFICE
CERTIFICATE OF CORRECTION

PATENT NO. : 6,917,025 B1
DATED : July 12, 2005
INVENTOR(S) : Hermann Diehl et al.

It is certified that error appears in the above-identified patent and that said Letters Patent is hereby corrected as shown below:

Title page,
Item [30], Foreign Application Priority Data, "1999" should read -- 1998 --.

Signed and Sealed this

Tenth Day of January, 2006

JON W. DUDAS
*Director of the United States Patent and Trademark Office*